Dec. 20, 1960 J. R. GRUBER 2,965,053
SOIL WORKING AND FERTILIZER AND SEED DISTRIBUTING APPARATUS
Filed March 4, 1957 4 Sheets-Sheet 1
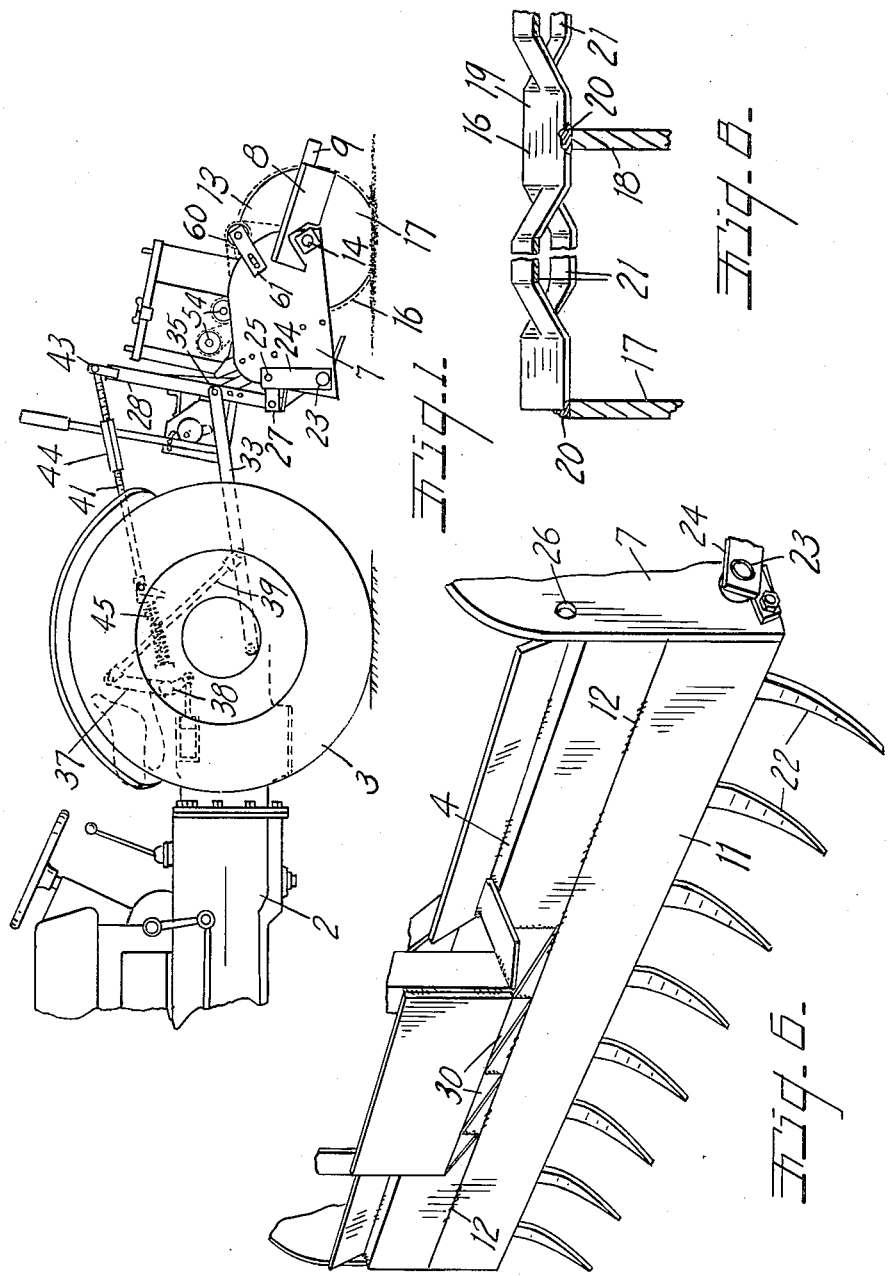
INVENTOR.
Jerry R. Gruber
BY
ATTORNEY.

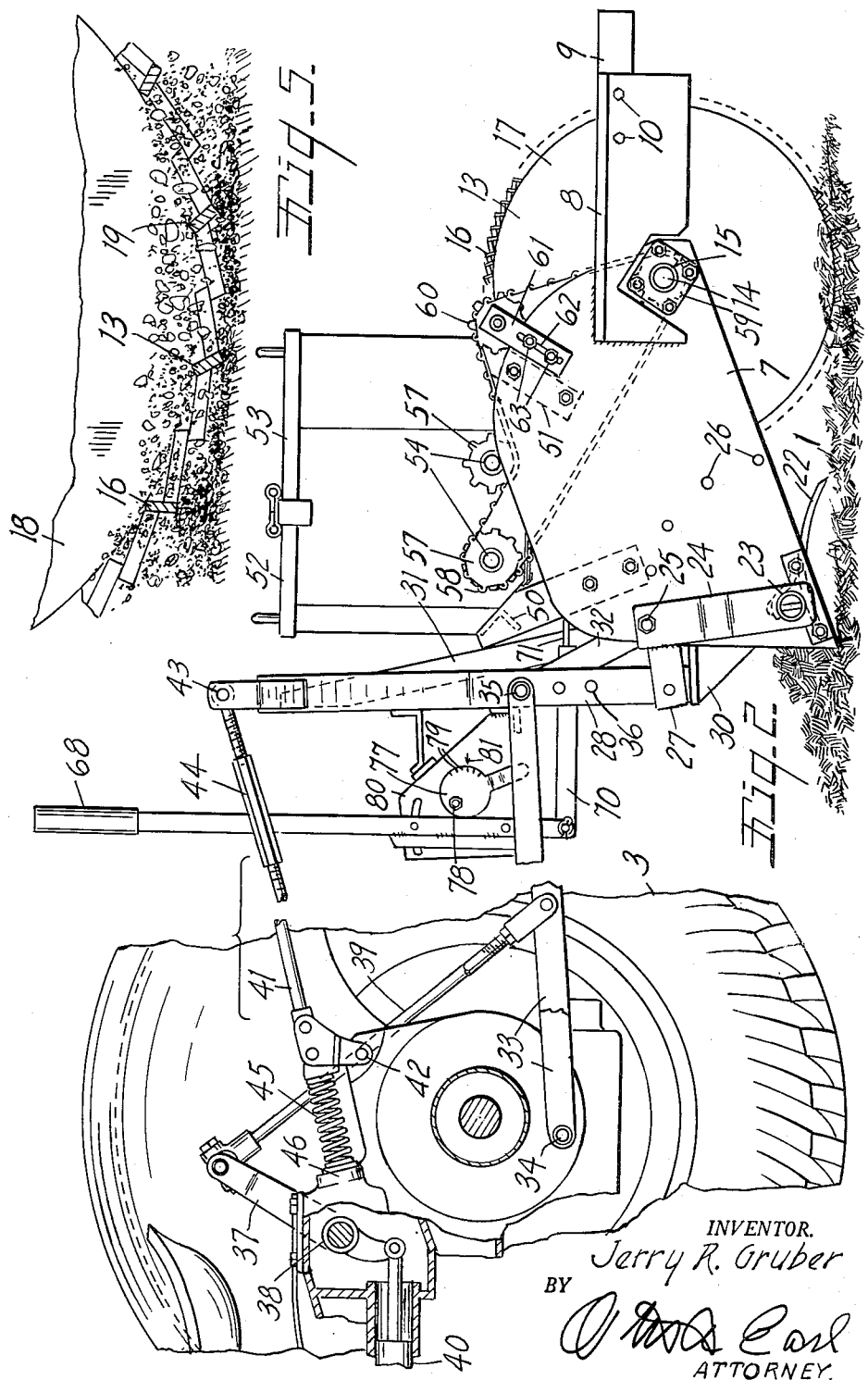

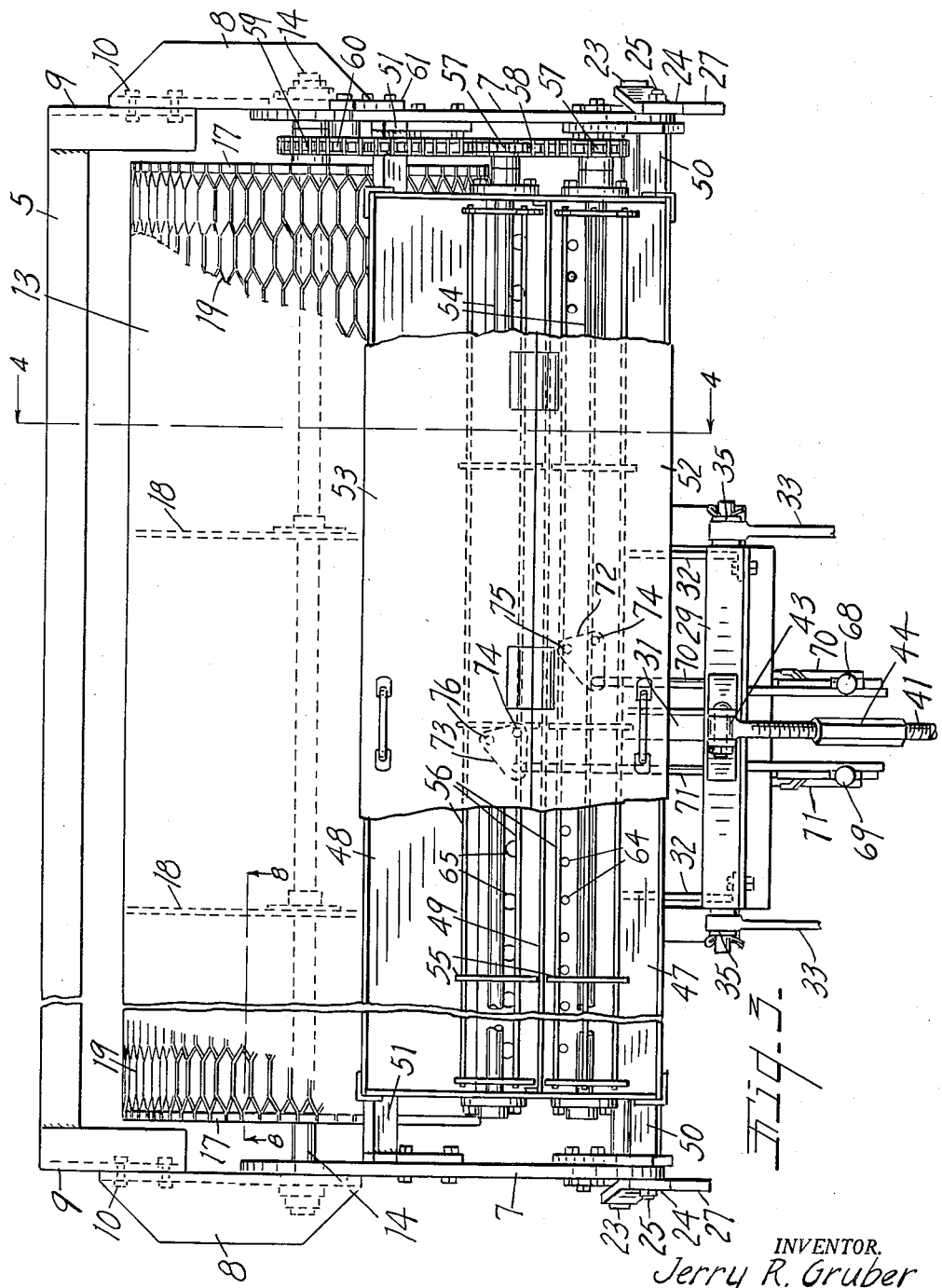

Dec. 20, 1960 J. R. GRUBER 2,965,053
SOIL WORKING AND FERTILIZER AND SEED DISTRIBUTING APPARATUS
Filed March 4, 1957 4 Sheets-Sheet 4
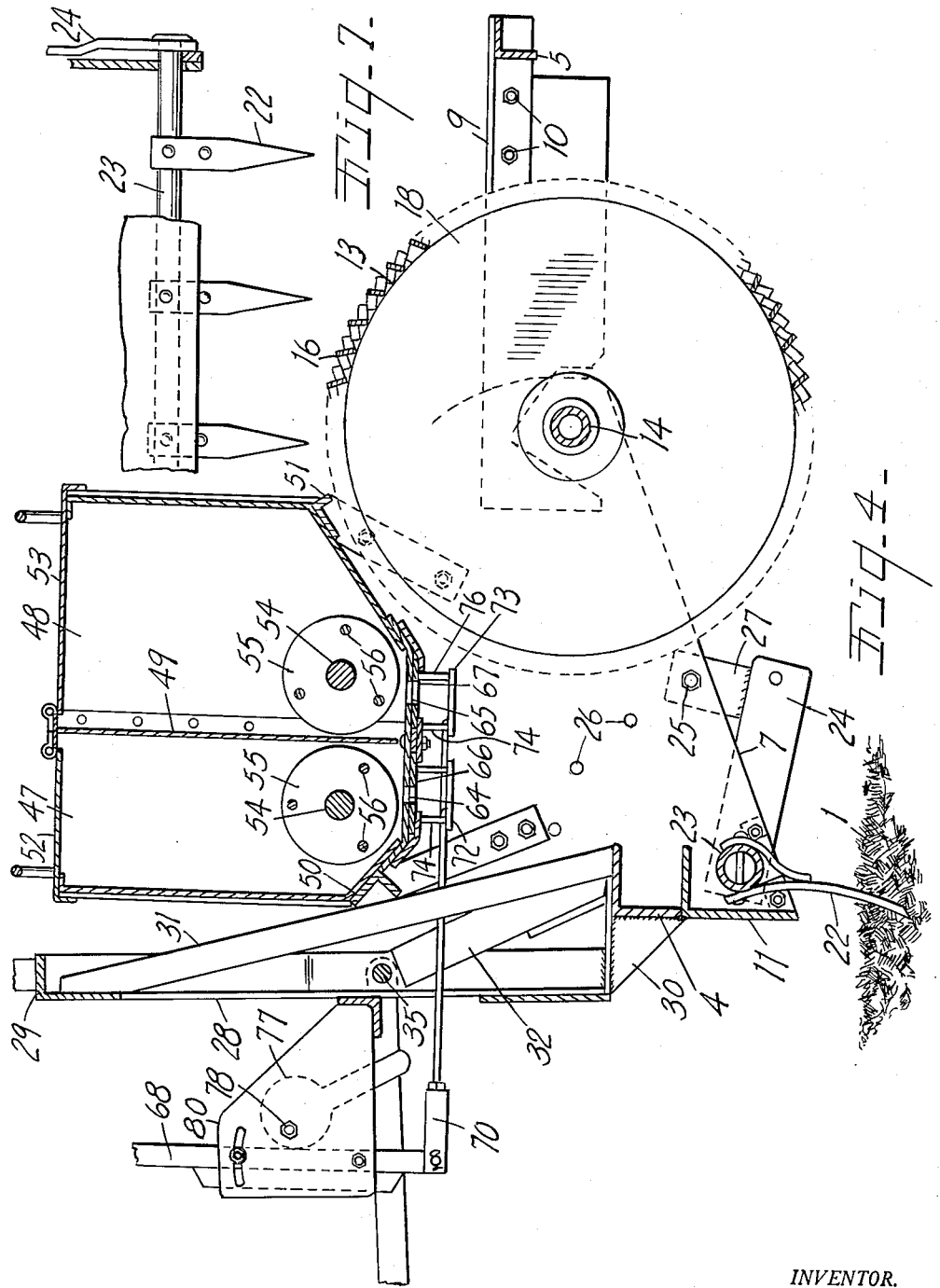
INVENTOR.
Jerry R. Gruber
BY
ATTORNEY.

United States Patent Office 2,965,053
Patented Dec. 20, 1960

2,965,053

SOIL WORKING AND FERTILIZER AND SEED DISTRIBUTING APPARATUS

Jerry R. Gruber, York, Nebr., assignor to Viking Manufacturing Company, Manhattan, Kans.

Filed Mar. 4, 1957, Ser. No. 643,858

13 Claims. (Cl. 111—10)

This invention relates to a machine or apparatus adapted to be mounted on a tractor or other supporting and translating carriage, and may be adjusted to various soil working positions and also as a seed and fertilizer distributor.

The main objects of this invention are,

First, to provide a soil working and fertilizer and seed distributing machine which is readily adapted for use as a soil working and surfacing machine and also as a seed and fertilizer distributor, the parts being assembled for attachment to a tractor or other carriage.

Second, to provide a machine or apparatus having these advantages which does not require a skilled mechanic for its effective use.

Third, to provide a machine or apparatus having these several advantages which is relatively simple in its parts and at the same time is strong and durable.

Objects relating to details and economies of the invention will appear from the description to follow. The invention is defined and pointed out in the claims. A preferred embodiment of the invention is illustrated in the accompanying drawing, in which:

Fig. 1 is a fragmentary side elevational view of a machine or apparatus embodying my invention mounted on a tractor which is conventionally shown and adjusted to one soil working position.

Fig. 2 is an enlarged fragmentary side elevational view showing the apparatus or machine adjusted to another working position, soil being conventionally illustrated.

Fig. 3 is a fragmentary plan view.

Fig. 4 is an enlarged fragmentary view partially in vertical section on line 4—4 of Fig. 3, illustrating another working position and also illustrating certain details of the seed and fertilizer distributors.

Fig. 5 is an enlarged fragmentary view illustrating the soil working drum in one working position relative to soil being worked.

Fig. 6 is a fragmentary perspective view of the scraper and the soil working teeth with the teeth in fully extended position.

Fig. 7 is a fragmentary view partially in section illustrating certain details of the toothed element and the adjustable support therefor.

Fig. 8 is a fragmentary view in section on a line corresponding to line 8—8 of Fig. 3, illustrating certain details of the soil working drum.

The embodiment of my invention illustrated is adapted to be mounted on tractors of widely used types, to be translated thereby and to be adjusted to meet varying working conditions, for example, as a soil leveling and lump crushing machine, as a machine for working soil preparatory to seeding and as a combined soil working, fertilizer and seed distributing machine.

In the accompanying drawing 1 represents ground or soil, 2 a tractor body, and 3 the rear wheel thereof. In the embodiment illustrated, the main frame comprises the front cross member 4, the rear cross member 5, and the intermediate supports 50—51. The side members 7 are, in this embodiment, plate-like and disposed vertically edgewise and fixedly secured to the cross members 4 and 5. Details of connecting these parts are not illustrated as they form no part of this invention, but desirably the parts may be welded. The angled rearwardly projecting arms 8 are fixedly secured to the outer sides of the side members 7, the rear cross member 5 being provided with forwardly projecting arms 9 which are bolted at 10 to the arms 8. This provides a generally open frame to receive and support various parts in their operating relation.

The scraper blade 11 is secured to the lower edge of the front frame cross member 4 desirably by welding as indicated at 12, Fig. 6, so that it in effect becomes a frame or bracing member. The lower edge of the scraper blade is substantially flush with the lower edges of the frame side members 7.

The soil working drum, designated generally by the numeral 13, is provided with a shaft 14 which is mounted in suitable bearings 15 provided therefor on the rear ends of the frame side members 7, as is clearly shown in Fig. 2. This ground working drum, which is sometimes called a "roller" is hollow and is provided with a foraminous tread designated generally by the numeral 16, the tread being supported by axially spaced disc-like members 17 and 18, the members being the same in structure, but 17 constitutes the end members of the drum and 18 the intermediate members for supporting the tread. The members 17 and 18 are fixedly secured to the shaft of the drum. The tread member 16 of the drum is foraminous, the openings therein being of such size as to permit the entrance into and discharging of soil from the drum. This shell is, in the embodiment illustrated and which is the preferred embodiment, formed of expanded metal having web portions 19 thereof fixedly secured to the support members 17 and 18 in generally radially disposed relation desirably by welds indicated at 20, Fig. 8.

The expanded reaches 21 are generally radially disposed relative to the axis of the drum, although owing to the expanded metal sheet being wrapped around and fixedly secured to the supporting discs, the reaches are not in radial planes, but the term "substantially radial" is used in referring to these reaches or segments of the drum as they are generally presented radially edgewise as the drum is rotated. The mesh of the drum or openings between the segments or reaches thereof are of such size as to permit the entrance of soil therethrough, as is best shown in Fig. 5. It should be understood, however, that in some working conditions the drum would be supported so that it would not penetrate the soil as deeply as is illustrated in Fig. 5. This operating position is desirable in working or conditioning uneven surfaces, not only as it insures the crushing or breaking up of lumps, but it tends to level the soil as the soil above a predetermined level enters the drum and is carried along until discharged in a low spot.

The harrow or ground breaking teeth 22 are fixedly mounted on the rockshaft 23 journaled in the side members 7 at the rear of the scraner. The shaft 23 is supported in various adjusted positions by means of the arm 24 thereon which is arranged at the outer side of one of the side members and provided with a supporting bolt 25 which may be selectively engaged with one of a series of holes 26 of the side frame, see Fig. 2. To support the teeth in their fully extended position, the arm 24 is provided with a projecting portion 27 having a hole therein adapted to receive anchoring bolt 25, as is illustrated in Fig. 4, which figure also illustrates the adjustability of the machine.

To facilitate this adjustment, the frame is provided with uprights 28 connected by a top cross piece 29. These uprights are rigidly secured to the frame by the supporting brackets 30 and are provided with braces 31 and 32. The drawbars 33 are pivotally mounted on the tractor at 34 and pivotally mounted on the uprights at 35, the uprights having a vertical series of holes 36 to receive the pivots 35. The drawbars are raised and lowered from the hydraulically actuated lever 37, which is pivoted at 38 on the tractor frame and connected by the link 39 to the drawbars. The actuating means is conventionally illustrated at 40. This arrangement permits a wide adjustment of the frame and the parts carried thereby relative to the soil being worked. Further tilting adjustment is provided by the adjusting link 41 which is pivoted at 42 to some tractor part and pivotally connected at 43 to the frame uprights. This adjusting link is provided with a turn buckle 44 which enables substantial variation in the length thereof and in a comparatively simple manner, thereby tiltably supporting the frame on its drawbar pivots 35.

Coil spring 45 engages the inner end of this adjusting link and is in supported thrust engagement at 46 with a part on the carriage. With the parts thus arranged, the machine or apparatus may be adjusted to varying work positions as may be deemed desirable for particular coil conditions.

The seed and fertilizer hoppers 47 and 48 are disposed in paralleled relation, being in the embodiment illustrated, a unitary structure provided with a longitudinal partition 49. These hoppers are mounted on supports 50 and 51 on the side members of the frame. They are provided with separate covers 52 and 53. Each hopper is provided with an agitator comprising a shaft 54 having axially spaced discs 55 thereon with angularly spaced rods 56 mounted on the discs. The rods, in the embodiment illustrated, are arranged through holes in the discs adjacent the periphery thereof. To drive these agitators, the shafts 54 are provided with sprockets 57 on the projecting ends thereof, and these sprockets are driven from the sprocket chain 58 which is trained around a sprocket 59 on the shaft of the drum. The idler sprocket 60 is provided for tensioning the sprocket chain, this being supported by the adjustable support 61 slotted at 62 to receive bolts 63 on the adjacent side member 7.

The seed and distributor hoppers have discharge openings 64 and 65 respectively and are provided with valves 66 and 67. These valves are of the sliding type and as such form no part of my present invention. They are of importance, however, in that the discharge of the seed and fertilizer is independently controlled by levers 68 and 69 which are connected by the rods 70 and 71 respectively which are connected to the pivoted links or members 72 and 73 pivoted at 74 and connected at 75 and 76 respectively to the valves to control the opening of these valves. The adjustable stops 77 pivotally mounted at 78 are provided and positioned to coact with the levers. These stops, in the embodiment illustrated, are eccentrically mounted and are provided with gauge indicia 79, the bracket 80 on which they are mounted being provided with the pointer indicia 81, see Figs. 2, 3 and 4.

It will be noted that the discharge of both fertilizer and seed is between the scraper and the soil working drum. In Fig. 2, I have illustrated the parts in a desirable seed and fertilizer discharging position in which the scraper is adjusted to the desired level and the harrow or soil break-up teeth are in their retracted position. The soil is struck off or level by the scraper, the seed and fertilizer distributed and worked into the soil by the soil working drum, which is desirably supported to work the seed into the soil to the desired depth. It will be understood, of course, that seed and fertilizer may be distributed at the same pass of the machine or at separate passes if it is desired to work the fertilizer into the ground more deeply than the seed, or the seed may be planted without fertilizer.

From the foregoing, it will be understood that the machine or apparatus may be adjusted for various uses and to meet various conditions. I have illustrated my invention as I have embodied it for attachment to a tractor. I have not illustrated or described other embodiments or adaptations, as it is believed that this disclosure will enable those skilled in the art to embody or adapt my invention as may be desired.

Having thus described the invention, what is claimed as new and is desired to be secured by Letters Patent is:

1. In a machine of the class described, a carriage, a frame comprising front and rear cross members and vertically disposed plate-like side members, a scraper mounted on said front cross member with its lower edge substantially flush with the lower edges of said side members, a hollow soil working drum comprising a shaft rotatably mounted on said side members and having laterally spaced drum tread support members fixedly mounted thereon, and a cylindrical peripheral open mesh drum tread member fixedly mounted on said tread support members, uprights on said frame, drawbars pivotally mounted on the carriage for vertical swinging adjustment and pivotally connected to said uprights, means on said carriage for raising and lowering said drawbars, an adjustable link pivotally mounted on said carriage and pivotally connected to said frame whereby the frame may be raised and lowered and tiltably supported relatively to the surface over which it is translated, and a spring supported by said carriage and acting on said link to yieldingly urge said frame downwardly in all positions of its adjustment thereof on said carriage.

2. A machine of the class described comprising, a carriage, a frame, a scraper mounted on said frame, a rockshaft mounted on said frame at the rear of said scraper and provided with a plurality of laterally spaced soil working teeth fixedly connected to the rockshaft, means for adjustably supporting said rockshaft whereby said teeth may be variably positioned relative to the lower edge of the scraper and selectively projected therebelow, a cylindrical soil working drum comprising a shaft rotatably mounted on said frame and having laterally spaced drum tread support members fixedly mounted thereon, and a cylindrical open mesh drum tread member formed of expanded metal fixedly mounted on said tread support members with the segments thereof disposed radially edgewise, and frame mounting means comprising drawbars mounted on the carriage for vertical swinging adjustment and pivotally connected to said frame, means on said carriage for raising and lowering said drawbars, and a longitudinally adjustable link mounted on said carriage and pivotally connected to said frame whereby the frame may be raised and lowered and is tiltably supported on said carriage relative to the surface over which it is translated, so that the scraper and the teeth and the drum can be selectively engaged with the ground individually and in combination.

3. A machine of the class described comprising, a carriage, a frame, a scraper mounted on said frame, a cylindrical soil working drum comprising a shaft rotatably mounted on said frame behind said scraper and having laterally spaced drum tread support members fixedly mounted thereon, and a cylindrical open mesh drum tread member formed of expanded metal fixedly mounted on said tread support members with the segments thereof disposed radially edgewise, and frame mounting means comprising drawbars mounted on the carriage for vertical swinging adjustment and pivotally connected to said frame, means on said carriage for raising and lowering said drawbars, and a longitudinally adjustable link mounted on said carriage and pivotally connected to said frame whereby the frame may be raised and lowered and is tiltably supported on said carriage relative to the surface over which it is translated.

4. A machine of the class described comprising, a carriage, a frame, a scraper blade mounted on said frame, a cylindrical soil working drum comprising a shaft rotatably mounted on said frame and having laterally spaced drum tread support members fixedly mounted thereon, and a cylindrical open mesh drum tread member formed of expanded metal fixedly mounted on said tread support members with the segments thereof disposed radially edgewise, a fertilizer distributor and a seed distributor mounted on said frame to discharge between said scraper blade and drum, and frame mounting means comprising drawbars mounted on the carriage for vertical swinging adjustment and pivotally connected to said frame, means on said carriage for raising and lowering said drawbars, and a longitudinally adjustable link mounted on said carriage and pivotally connected to said frame whereby the frame may be raised and lowered and is tiltably supported on said carriage relative to the surface over which it is translated.

5. A machine of the class described comprising, a carriage, a frame vertically and forwardly and rearwardly tiltably adjustably mounted on said carriage, a scraper mounted on said frame, a cylindrical soil working drum comprising a shaft rotatably mounted on said frame and laterally spaced drum tread support members fixedly mounted on said shaft, said shaft being parallel and eccentric to the axis of pivot adjustment of said frame, and a cylindrical open mesh drum tread members formed of expanded metal fixedly mounted on said tread support members with the segment thereof disposed radially edgewise, and a fertilizer distributor and seed distributor mounted on said frame to discharge between said scraper blade and drum.

6. The combination with a carriage, of a frame, means mounting said frame on said carriage for translation therewith and for vertical and for fore and aft tilting adjustment of the frame with respect to the carriage and for vertical and tilting adjustment of the frame relative to the surface of the soil over which the carriage is traveling, a scraper blade mounted on said frame transversely of the path of travel of the carriage, a toothed harrow element rotatably adjustably mounted transversely on said frame for adjustment to an operative position with the teeth thereof projecting below the edge of the scraper or to be collapsed with the teeth rearwardly of the scraper, a rotatably supported cylindrical soil working drum mounted transversely on said frame in rearwardly spaced relation to the scraper blade and the harrow element and the axis of tilting adjustment of the frame, said drum having an open network tread consisting of a multiplicity of soil engaging blades spaced to permit entrance of the soil into the drum and escape of the soil therefrom as the drum is rotatably translated upon the soil, the tilting adjustability of the frame being such as to permit the positioning of either the scraper or the harrow element in soil working position with the drum in elevated non soil working position or the positioning of the drum in soil working position with the scraper and harrow element in retracted position, or the positioning of either the scraper and the drum, or the harrow element and the drum in position for simultaneous soil working, and a material distributor disposed on said frame to discharge upon the soil at the rear of the scraper and the harrow elements and in advance of the drum.

7. The combination with a carriage, of a frame, means mounting said frame on said carriage for translation therewith and for vertical and for fore and aft tilting adjustment of the frame with respect to the carriage and for vertical and tilting adjustment of the frame relative to the surface of the soil over which the carriage is traveling, a scraper blade mounted on said frame transversely of the path of travel of the carriage, a toothed harrow element rotatably adjustably mounted transversely on said frame for adjustment to an operative position with the teeth thereof projecting below the edge of the scraper or to be collapsed with the teeth rearwardly of the scraper, a rotatably supported cylindrical soil working drum mounted transversely on said frame in rearwardly spaced relation to the scraper blade and the harrow element, said drum having an open network tread consisting of a multiplicity of soil engaging blades spaced to permit entrance of the soil into the drum and escape of the soil therefrom as the drum is rotatably translated upon the soil, the tilting adjustability of the frame being such as to permit the positioning of either the scraper or the harrow element in soil working position with the drum in elevated non soil working position or the positioning of the drum in soil working position with the scraper and harrow element in retracted position, or the positioning of either the scraper and the drum, or the harrow element and the drum in position for simultaneous soil working.

8. The combination with a carriage, of a frame, means mounting said frame on said carriage for translation therewith and for vertical and for fore and aft tilting adjustment of the frame with respect to the carriage and for vertical and tilting adjustment of the frame relative to the surface of the soil over which the carriage is traveling, a scraper blade mounted on said frame transversely of the path of travel of the carriage, a rotatably supported cylindrical soil working drum mounted transversely on said frame in rearwardly spaced relation to the scraper blade, said drum having an open network tread, the openings being such as to permit entrance of the soil into the drum and escape of the soil therefrom as the drum is rotatably translated upon the soil, the tilting adjustability of the frame being such as to permit the positioning of the scraper in soil working position with the drum in elevated non soil working position or the positioning of the drum in soil working position with the scraper in non working position, or the positioning of the scraper and the drum in position for simultaneous soil working, and a material distributor disposed on said frame to discharge upon the soil at the rear of the scraper and in advance of the drum.

9. The combination with a carriage, of a frame, means mounting said frame on said carriage for translation therewith and for vertical and for fore and aft tilting adjustment of the frame with respect to the carriage and for vertical and tilting adjustment of the frame relative to the surface of the soil over which the carriage is traveling, a scraper blade mounted on said frame transversely of the path of travel of the carriage, a rotatably supported cylindrical soil working drum mounted transversely on said frame in rearwardly spaced relation to the scraper blade, said drum having an open network tread, the openings being such as to permit entrance of the soil into the drum and escape of the soil therefrom as the drum is rotatably translated upon the soil, the tilting adjustability of the frame being such as to permit the positioning of the scraper in soil working position or the positioning of the drum in soil working position with the scraper in non working position or the positioning of the scraper and the drum in position for simultaneous soil working.

10. The combination with a carriage, of a frame, means mounting said frame on said carriage for translation therewith and for vertical and for fore and aft tilting adjustment of the frame with respect to the carriage and for vertical and tilting adjustment of the frame relative to the surface of the soil over which the carriage is traveling, a toothed harrow element mounted on said frame transversely thereof, a rotatably supported cylindrical soil working drum mounted transversely on said frame in rearwardly spaced relation to the harrow element, said drum having an open network tread of such mesh as to pulverize the soil while permitting entrance of the soil into the drum and escape of the soil therefrom as the drum is rotatably translated upon the soil, the tilting adjustability of the frame being such as to permit the positioning of the harrow element in soil working position with the drum in elevated non soil working position or the positioning of the drum in soil working position with the harrow element in retracted position, or the positioning of the harrow element and the drum in position for simultaneous soil working, and a material distributor disposed on said frame to discharge upon the soil at the rear of the harrow element and in advance of the drum.

11. The combination with a carriage, of a frame, means mounting said frame on said carriage for translation therewith and for vertical and for fore and aft tilting adjustment of the frame with respect to the carriage and for vertical and tilting adjustment of the frame relative to the surface of the soil over which the carriage is traveling, a toothed harrow element mounted on said frame transversely thereof, a rotatably supported cylindrical soil working drum mounted transversely on said frame in rearwardly spaced relation to the harrow element, said drum having an open network tread of such mesh as to pulverize the soil while permitting entrance of the soil into the drum and escape of the soil therefrom as the drum is rotatably translated upon the soil, the tiling adjustability of the frame being such as to permit the positioning of the harrow element in soil working position with the drum in elevated non soil working position or the positioning of the drum in soil working position with the harrow element in retracted position, or the positioning of the harrow element and the drum in position for simultaneous soil working.

12. In a machine of the class described, a carriage adapted to be moved over the ground, a frame, means mounting said frame on said carriage for vertical adjustment, a soil working drum comprising a rotatably supported driven shaft disposed on said frame transversely of the path of travel of the carriage, laterally spaced tread support members fixedly mounted on said shaft, a cylindrical expanded metal tread member supportedly mounted on said disc-like support members and extending from and to the end of the drum, said tread member having web portions thereof fixedly secured to said support members, the reaches of the tread member being disposed in substantial radial relation to the axis of the drum so that when the drum is rotatably translated upon soil said reaches are presented substantially edgewise to the soil, the openings in the drum defined by said reaches being substantially elongated and disposed longitudinally of the drum, whereby soil is worked as the drum is translated across the same and portions of the soil may enter the drum through said openings to be translated and pulverized thereby and deposited in recessed portions of the soil.

13. In a machine of the class described, a carriage adapted to be moved over the ground, a frame, means mounting said frame on said carriage for vertical adjustment, a soil working drum comprising a rotatably supported driven shaft disposed on said frame transversely of the path of travel of the carriage, laterally spaced tread support members fixedly mounted on said shaft, a cylindrical expanded metal tread member supportedly mounted on said disc-like support members and extending from end to end of the drum, said tread member having web portions thereof fixedly secured to said support members, the reaches of the tread member being disposed in substantial radial relation to the axis of the drum so that when the drum is rotatably translated upon soil said reaches are presented substantially edgewise to the soil, whereby soil is worked as the drum is translated across the same and portions of the soil may enter the drum through said openings to be translated and pulverized thereby and deposited in recessed portions of the soil.

References Cited in the file of this patent

UNITED STATES PATENTS

| | | |
|---|---|---|
| 822,609 | Johnson | June 5, 1906 |
| 884,943 | Murray | Apr. 14, 1908 |
| 925,565 | Curtis | June 22, 1909 |
| 933,292 | Coldwell | Sept. 7, 1909 |
| 1,336,902 | Healy | Apr. 13, 1920 |
| 1,839,000 | Phan-Quang | Dec. 29, 1931 |
| 1,897,769 | Seiser | Feb. 14, 1933 |
| 2,042,196 | Senz | May 26, 1936 |
| 2,518,363 | Orelind | Aug. 8, 1950 |
| 2,551,870 | Bridger | May 8, 1951 |
| 2,657,619 | Gilraeth | Nov. 3, 1953 |
| 2,674,818 | Carnes | Apr. 13, 1954 |
| 2,730,054 | McDonald | Jan. 10, 1956 |
| 2,733,838 | Neff | Feb. 7, 1956 |

FOREIGN PATENTS

| | | |
|---|---|---|
| 32,910 | France | Dec. 21, 1927 |
| 1,092,775 | France | Nov. 10, 1954 |